United States Patent
Harris et al.

(10) Patent No.: US 9,928,727 B2
(45) Date of Patent: Mar. 27, 2018

(54) FLAME DETECTORS

(71) Applicant: Carrier Corporation, Farmington, CT (US)

(72) Inventors: Peter R. Harris, West Hartford, CT (US); Marcin Piech, East Hampton, CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 15/220,112

(22) Filed: Jul. 26, 2016

(65) Prior Publication Data

US 2017/0032663 A1 Feb. 2, 2017

Related U.S. Application Data

(60) Provisional application No. 62/198,036, filed on Jul. 28, 2015.

(51) Int. Cl.
*G08B 29/00* (2006.01)
*G08B 29/14* (2006.01)
(Continued)

(52) U.S. Cl.
CPC ............ *G08B 29/145* (2013.01); *G01J 1/429* (2013.01); *G01J 1/4228* (2013.01); *G08B 17/12* (2013.01)

(58) Field of Classification Search
CPC .... G08B 29/145; G08B 25/004; G08B 29/12; G08B 29/126; G08B 17/00; G08B 17/113;
(Continued)

(56) References Cited

U.S. PATENT DOCUMENTS 3,665,440 A * 5/1972 McMenamin ......... G08B 17/12
250/338.1
4,090,177 A 5/1978 Urata et al.
(Continued)

FOREIGN PATENT DOCUMENTS

CN 1400674 A 3/2003
CN 100358159 C 12/2007
(Continued)

OTHER PUBLICATIONS http://ieeexplore.ieee.org/xpl/article titled A Fire Detecting Method Based on Multi-Sensor Data Fusion by Shaohau Chen, Hong Bao, Xianyun Zeng, Yimin Yang, Faculty of Automation, Guangdong University ofTechnology, Guangzhou, 510090, P.R. China, bhong@163.net.
(Continued)

*Primary Examiner* — Joseph Feild
*Assistant Examiner* — Rufus Point
(74) *Attorney, Agent, or Firm* — Locke Lord LLP; Scott D. Wofsy; Christopher J. Cillié

(57) ABSTRACT

A flame detector includes a UV sensor sensitive to solar UV radiation and a secondary sensor sensitive to non-UV radiation. A controller is operatively connected to the UV sensor and the secondary sensor to: signal an alarm in response to receiving input from the UV sensor indicative of a strong UV source and input from the secondary sensor indicative of a weak non-UV radiation source; and suppress an alarm in response to receiving a signal from the UV sensor indicative of a strong UV source and a signal from the secondary sensor indicative of a strong non-UV radiation source.

14 Claims, 1 Drawing Sheet

(51) Int. Cl.
*G01J 1/42* (2006.01)
*G08B 17/12* (2006.01)

(58) Field of Classification Search
CPC .... G08B 25/008; G08B 29/14; G08B 29/181; G08B 17/12; G01J 1/4228; G01J 1/429
See application file for complete search history.

(56) References Cited

U.S. PATENT DOCUMENTS

| | | | | |
|---|---|---|---|---|
| H000101 | H * | 8/1986 | Walker | 250/332 |
| 5,189,398 | A * | 2/1993 | Mizutani | G08B 17/12 250/372 |
| 5,311,167 | A * | 5/1994 | Plimpton | G08B 29/183 250/339.01 |
| 5,339,070 | A * | 8/1994 | Yalowitz | F23N 5/082 250/339.05 |
| 5,494,700 | A | 2/1996 | Anderson et al. | |
| 5,699,035 | A | 12/1997 | Ito et al. | |
| 5,723,877 | A * | 3/1998 | Sugawa | H01L 27/14609 250/338.4 |
| 5,726,440 | A * | 3/1998 | Kalkhoran | H01L 31/103 250/214.1 |
| 5,773,826 | A * | 6/1998 | Castleman | G08B 17/12 250/339.14 |
| 5,830,412 | A | 11/1998 | Kimura et al. | |
| 5,833,740 | A * | 11/1998 | Brais | A61L 9/20 422/24 |
| 6,166,647 | A | 12/2000 | Wong | |
| 6,239,435 | B1 * | 5/2001 | Castleman | G08B 17/12 250/339.15 |
| 6,255,651 | B1 | 7/2001 | Laluvein et al. | |
| 6,358,378 | B2 | 3/2002 | Choi et al. | |
| 6,518,077 | B2 | 2/2003 | Narayan et al. | |
| 6,621,192 | B2 | 9/2003 | Lu et al. | |
| 6,633,231 | B1 * | 10/2003 | Okamoto | G08B 25/08 340/539.11 |
| 6,846,731 | B2 | 1/2005 | Lu et al. | |
| 7,132,668 | B2 | 11/2006 | Vispute et al. | |
| 7,172,813 | B2 | 2/2007 | Burgener, II et al. | |
| 7,180,588 | B2 * | 2/2007 | Geshwind | G01J 3/02 356/310 |
| 7,202,794 | B2 | 4/2007 | Huseynov et al. | |
| 7,329,895 | B2 * | 2/2008 | Cole | G01J 3/26 257/22 |
| 7,333,910 | B2 | 2/2008 | Ishii | |
| 7,432,024 | B2 | 10/2008 | Talin et al. | |
| 7,541,938 | B1 | 6/2009 | Engelhaupt | |
| 7,566,875 | B2 | 7/2009 | Starikov et al. | |
| 7,767,253 | B2 | 8/2010 | Sharma | |
| 7,838,869 | B2 * | 11/2010 | Perera | B82Y 20/00 250/338.4 |
| 8,093,582 | B2 * | 1/2012 | Perera | B82Y 20/00 250/338.4 |
| 8,536,618 | B2 | 9/2013 | Richardson et al. | |
| 8,878,157 | B2 | 11/2014 | Wu et al. | |
| 8,926,317 | B2 | 1/2015 | Farrell et al. | |
| 2002/0011570 | A1 * | 1/2002 | Castleman | G08B 17/12 250/339.15 |
| 2004/0178466 | A1 * | 9/2004 | Merrill | H01L 27/14621 257/440 |
| 2006/0183249 | A1 | 8/2006 | Yao et al. | |
| 2008/0036593 | A1 | 2/2008 | Rose-Pehrsson et al. | |
| 2010/0002336 | A1 * | 1/2010 | Sun | B82Y 25/00 360/122 |
| 2010/0038540 | A1 * | 2/2010 | Hannebauer | G01J 3/36 250/338.1 |
| 2010/0148083 | A1 * | 6/2010 | Brown | G01J 3/02 250/372 |
| 2010/0276003 | A1 | 11/2010 | Kawano et al. | |
| 2011/0043503 | A1 * | 2/2011 | Hadwen | G01J 1/1626 345/207 |
| 2011/0259080 | A1 | 10/2011 | Ratcliffe et al. | |
| 2012/0001760 | A1 | 1/2012 | Harchanko | |
| 2012/0052454 | A1 * | 3/2012 | Roy | F23D 23/00 431/74 |
| 2013/0092933 | A1 | 4/2013 | Nakamura | |
| 2013/0193417 | A1 * | 8/2013 | Ponomarev | G01N 27/121 257/40 |
| 2013/0341619 | A1 | 12/2013 | Nakamura | |
| 2014/0284598 | A1 | 9/2014 | Boutwell et al. | |
| 2014/0287147 | A1 | 9/2014 | Bartl et al. | |
| 2014/0319317 | A1 | 10/2014 | Lai et al. | |
| 2015/0022592 | A1 | 1/2015 | Aoyama et al. | |
| 2015/0171257 | A1 | 6/2015 | Maekawa et al. | |
| 2015/0348400 | A1 * | 12/2015 | Zribi | G08B 29/185 340/506 |
| 2015/0355350 | A1 * | 12/2015 | Mederos | G01V 8/10 356/72 |
| 2017/0030768 | A1 * | 2/2017 | Dardona | G01J 1/429 |

FOREIGN PATENT DOCUMENTS

| | | |
|---|---|---|
| CN | 101210313 A | 7/2008 |
| CN | 101285147 A | 10/2008 |
| CN | 101285173 A | 10/2008 |
| CN | 101286535 A | 10/2008 |
| CN | 100561742 C | 11/2009 |
| CN | 101807619 A | 8/2010 |
| CN | 101866983 A | 10/2010 |
| CN | 101935876 A | 1/2011 |
| CN | 101969023 A | 2/2011 |
| CN | 102110735 A | 6/2011 |
| CN | 201964955 U | 9/2011 |
| CN | 102569483 A | 7/2012 |
| CN | 102694053 A | 9/2012 |
| CN | 202633358 U | 12/2012 |
| CN | 103205706 A | 7/2013 |
| CN | 103219418 A | 7/2013 |
| CN | 103258869 A | 8/2013 |
| CN | 103346171 A | 10/2013 |
| CN | 103346199 A | 10/2013 |
| CN | 103441154 A | 12/2013 |
| CN | 103441186 A | 12/2013 |
| CN | 103545397 A | 1/2014 |
| CN | 103915524 A | 7/2014 |
| CN | 103972310 A | 8/2014 |
| CN | 104504838 A | 4/2015 |
| CN | 104617180 A | 5/2015 |
| GB | 2222908 A | 3/1990 |
| JP | 2006278487 A | 10/2006 |
| JP | 2013-004674 A | 1/2013 |
| KR | 101009532 B1 | 1/2011 |
| KR | 101192934 B1 | 10/2012 |
| WO | WO-2010091703 A1 | 8/2010 |

OTHER PUBLICATIONS http://www.tradeindia.com/fp1824652/IR-UV-Flame-Detector.html, ESP Safety Pvt. Ltd, Description/Specification of IR/UV Flame Detector.
https://www.google.co.in, Open Access algorithms ISSN 1999-4893 www.mdpi.com/journal algorithms, Article in Algorithms 2014, 7, 523; doi:10.3390/a7040523 titled "Multi-Sensor Building Fire Alarm System with Information Fusion Technology Based on D-S Evidence Theory" by Qian Ding, Zhenghong Peng, Tianzhen Liu and Qiaohui Tong, School of Urban Design, Wuhan University, Bayi Road 16, Wuhan 430072, Hubei, China.
Extended European Search Report dated Dec. 19, 2016, from European Patent Office in corresponding European Patent Application No. 16181769.7.
Suo Bai et al.: "High-Performance Integrated ZnO Nanowire UV Sensors on Rigid and Flexible Substrates", Advanced Functional Materials, Wiley—V C H Verlag GmbH & Co. KGAA, DE, vol. 21, No. 23, Dec. 6, 2011 (Dec. 6, 2011), pp. 4464-4469, XP001571417, ISSN: 1616-301X, DOI: 10.1002/ADFM.201101319.
Abdelrahim Ate et al: "Ultrafast and High Sensitive UV/IR Photodetector Based on a Single SnO 2 Nanowire", International Journal of Optoelectronic Engineering, Jan. 1, 2014 (Jan. 1, 2014), pp. 6-10, XP055326489, 001: 10.5923/j.ijoe.20140401.02.

(56) References Cited

OTHER PUBLICATIONS

Yanjun Zhang et at: "High performance ultraviolet photodetectors based on an individual Zn2SnO4 single crystalline nanowire",Journal of Materials Chemistry, vol. 20, No. 44, Jan. 1, 2010 (Jan. 1, 2010), p. 9858, XP055326623,GB ISSN: 0959-9428, DOI: 10.1039/c0jm02872j.

H. Zhu et at: "Metal-Oxide-Semiconductor-Structured MgZnO Ultraviolet Photodetector with High Internal Gain", Journal of Physical Chemistry C, vol. 114, No. 15, Apr. 22, 2010 (Apr. 22, 2010), pp. 7169-7172, XP055326648, ISSN: 1932-7447, DOI: 10.1021/jp101083n.

Lee Keun et at: "Photosensitivity of solution-based indium gallium zinc oxide single-walled carbon nanotubes blend thin film transistors", Applied Physics Letters, A I P Publishing LLC, US, vol. 94, No. 10, Mar. 13, 2009 (Mar. 13, 2009), pp. 102112-102112,XP012118314, ISSN: 0003-6951, DOI: 10.1063/1.3098406.

M.M. Fan et al.: "High-performance solar-blind ultraviolet photodetector based on mixed-phase ZnMgO thin film", *Applied Physics Letters* 105, 011117 (2014).

M. Wei, et al.: "Characteristics of ZnMgO thin films prepared by the Sol-gel method," *Advanced Materials Research*, 1662-8985, vols. 60-61, pp. 110-113, Jan. 20, 2009.

M. Caglar, et al.: "MgxZn1-xO (x=0-1) films fabricated by sol-gel spin coating," *Materials Reserach Bulleting* 45, (2010), pp. 284-287.

Extended Search Report in connection with EP16181490.0 dated Jan. 4, 2017.

Y. N. Hou, et al.: "Monolithic color-selective ultraviolet (266-315 nm) photodetector based on a wurtzite MgxZn1-xO film," Applied Physics Letters 105, 133510 (2014).

K. Hoggas, et al.: "Structural, microstructural, and optical properties of Zn1-xMgxO thin films grown onto glass substrate by ultrasonic spray pyrolysis," Applied Physics A (2015) 120:745-755.

Partial Search report dated Jan. 5, 2017 in connection with EP Application No. EP16181398.5.

Chu T. T. et al.,: "Characterization of UV photodetectors with Mg"xZn" 1"@?" xO thin fims," Microelectronic Engineering, Elsevier Publishers BV., Amsterdam, NL, vol. 87, No. 9, Nov. 1, 2010, pp. 1777-1780.

S. S. Hullavarad et al.,: "Realization of Mg(x=0.15)Zn(1-x=0.85)O-based metal-semiconductor-metal UV detector on quartz and sapphire," J. Vac. Sci. Technol. A23(4), Jul./Aug. 2005, American Vacuum Society, pp. 982-985.

H. Zuopeng, et al.: "Fabrication and characterization of MgxNi1-xl thin fims by sol-gel dip-coating," Chinese Journal of Semiconductors, vol. 26, Issue 4, Apr. 2005, pp. 721-725 with English abstract.

\* cited by examiner

| RADIATION | UV SPECTRAL REGION | NIR SPECTRAL REGION | SUPRESS ALARM? |
|---|---|---|---|
| SUNLIGHT | WEAK | STRONG | YES |
| FLAME | STRONG | WEAK | NO |
| SUNLIGHT AND FLAME | STRONG | STRONG | FURTHER INFORMATION NEEDED |

FLAME DETECTORS

CROSS-REFERENCE TO RELATED APPLICATION

This application claims the benefit of priority under 35 U.S.C. § 119(e) to U.S. Provisional Application No. 62/198,036, filed Jul. 28, 2015, which is incorporated herein by reference in its entirety.

BACKGROUND OF THE INVENTION

1. Field of the Invention

The present disclosure relates to sensors, and more particularly to flame sensors such as used in flame and smoke detectors.

2. Description of Related Art

Flame detectors can be used to detect flames as small as those produced by a lit match stick. This is useful, for example, to sound an alarm if a fire breaks out indoors. Ultraviolet (UV) sensors can be particularly useful in detecting the radiation from flames in this type of application. However, since there are non-flame sources of UV radiation, including sunlight, careful design is required to avoid false alarms. One solution to this problem is to use a UV sensor sensitive to UV-C radiation, and non-sensitive to UV-B radiation, since UV-C radiation from the sun is filtered out by the atmosphere, whereas the atmosphere allows a portion of solar UV-B radiation to reach the surface. Such sensors will not give rise to a false alarm when receiving solar radiation, such as in a room with an exterior window. UV phototubes can provide the sharp cutoff between UV-C and UV-B radiation necessary for this purpose. However, when compared to sensors typically used in residential settings, for example, UV phototubes are relatively costly, as are filters for general UV sensors that filter out UV-B radiation. UV phototubes also require relatively high voltages and are relatively fragile.

Such conventional methods and systems have generally been considered satisfactory for their intended purpose. However, there is still a need in the art for improved flame detectors. The present disclosure provides a solution for this need.

SUMMARY OF THE INVENTION

A flame detector includes a UV sensor sensitive to solar UV radiation and a secondary sensor sensitive to non-UV radiation. A controller is operatively connected to the UV sensor and the secondary sensor to: signal an alarm in response to receiving input from the UV sensor indicative of a strong UV source and input from the secondary sensor indicative of a weak non-UV radiation source; and suppress an alarm in response to receiving a signal from the UV sensor indicative of a weak UV source and a signal from the secondary sensor indicative of a strong non-UV radiation source.

In any of the embodiments, the UV sensor can be sensitive to both UV-C and UV-B radiation. In any of the embodiments, the UV sensor and the secondary sensor can be thin film sensors stacked on top of one another with the UV sensor on top. The secondary sensor can be a NIR sensor sensitive to NIR radiation. The controller can be operatively connected to the NIR sensor to: signal an alarm in response to receiving input from the UV sensor indicative of a strong UV source and input from the secondary sensor indicative of a weak NIR radiation source; and suppress an alarm in response to receiving a signal from the UV sensor indicative of a weak UV source and a signal from the secondary sensor indicative of a strong NIR radiation source. The flame detector can further include a visible radiation sensor sensitive to visible radiation, wherein the visible radiation sensor is operatively connected to the controller for using the ratio of signals from the visible radiation sensor and the NIR sensor to reject false alarms due to sunlight exposure or affirm presence of flame. The UV, visible, and NIR sensors can be thin film sensors stacked on top of one another with the UV sensor on top.

It is also contemplated that the secondary sensor can be a visible radiation sensor sensitive to visible radiation, and wherein the controller is operatively connected to the visible radiation sensor to: signal an alarm in response to receiving input from the UV sensor indicative of a strong UV source and input from the secondary sensor indicative of a weak visible radiation source; and suppress an alarm in response to receiving a signal from the UV sensor indicative of a weak UV source and a signal from the secondary sensor indicative of a strong visible radiation source.

The controller can be configured to either suppress or signal an alarm in response to receiving a signal from the UV sensor indicative of a strong UV source, a signal from the secondary sensor indicative of a strong non-UV radiation source. For example, the flame detector can include a smoke sensor operatively connected to the controller to: signal an alarm in response to receiving input from the UV sensor indicative of a strong UV source, input from the secondary sensor indicative of a strong non-UV radiation source, and input from the smoke sensor indicative of the presence of smoke; and suppress an alarm in response to receiving a signal from the UV sensor indicative of a strong UV source, a signal from the secondary sensor indicative of a strong non-UV radiation source, and input from the smoke sensor indicative of lack of smoke. It is also contemplated that the flame detector can include an input module operatively connected to the controller to accept user input indicative of whether or not an alarm should be signaled or suppressed in response to receiving a signal from the UV sensor indicative of a strong UV source, a signal from the secondary sensor indicative of a strong non-UV radiation source.

A method of flame detection includes signaling an alarm in response to receiving input from a UV sensor indicative of a strong UV source and input from the secondary sensor indicative of a weak non-UV radiation source, wherein the UV sensor is sensitive to solar UV radiation. The method also includes suppressing an alarm in response to receiving a signal from the UV sensor indicative of a weak UV source and a signal from the secondary sensor indicative of a strong non-UV radiation source.

The method can include signaling an alarm in response to receiving input from the UV sensor indicative of a strong UV source, input from the secondary sensor indicative of a strong non-UV radiation source, and input from a smoke sensor indicative of the presence of smoke; and suppressing an alarm in response to receiving a signal from the UV sensor indicative of a strong UV source, a signal from the secondary sensor indicative of a strong non-UV radiation source, and input from the smoke sensor indicative of lack of smoke. It is also contemplated that the method can include complying with user input indicative of whether or not an alarm should be signaled or suppressed in response to receiving a signal from the UV sensor indicative of a strong UV source, a signal from the secondary sensor indicative of a strong non-UV radiation source. Signaling and suppressing can include receiving input from the UV sensor indicative of both a UV-C and UV-B radiation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
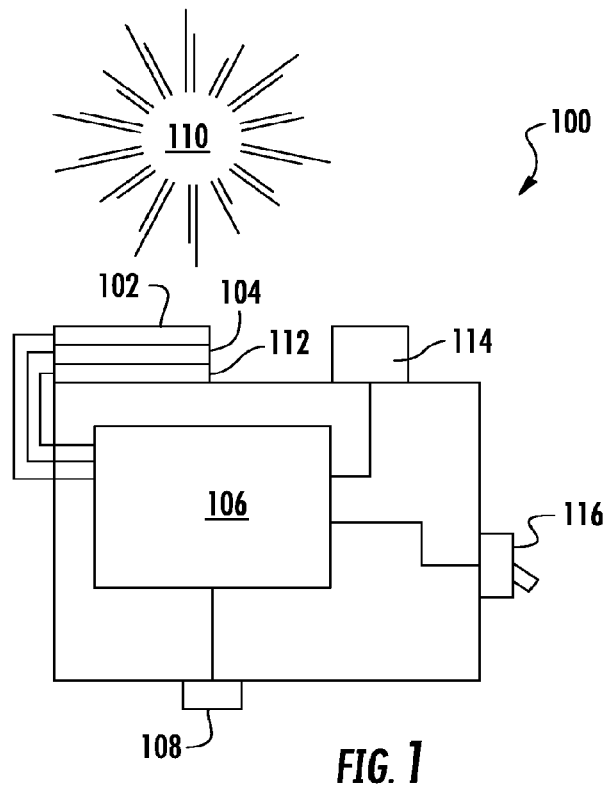
FIG. 1 is a schematic view of an exemplary embodiment of a flame detector constructed in accordance with the present disclosure, showing the sensors and controller as well as a radiation source.
FIG. 2 is a chart showing truth table logic for governing the flame detector of FIG. 1.

Reference will now be made to the drawings wherein like reference numerals identify similar structural features or aspects of the subject disclosure. For purposes of explanation and illustration, and not limitation, a partial view of an exemplary embodiment of a flame detector in accordance with the disclosure is shown in FIG. 1 and is designated generally by reference character 100. Other embodiments of flame detectors in accordance with the disclosure, or aspects thereof, are provided in FIG. 2, as will be described. The systems and methods described herein can be used for flame detection, for example in combined flame and smoke detectors for home use. Flame detector 100 includes a UV sensor 102 sensitive to solar UV radiation and a secondary sensor 104 sensitive to non-UV radiation. A controller 106 is operatively connected to UV sensor 102 and secondary sensor 104 to signal an alarm, e.g., through output device 108, depending on the nature of a detected radiation source 110.

In response to receiving input from UV sensor 102 indicative of a strong UV source and input from secondary sensor 104 indicative of a weak non-UV radiation source, controller 106 signals an alarm. However, controller 106 suppresses an alarm, e.g., by refraining from signaling an alarm through output device 108, in response to receiving a signal from UV sensor 102 indicative of a weak UV source and a signal from secondary sensor 104 indicative of a strong non-UV radiation source. It is contemplated that UV sensor 102 can be sensitive to both UV-C and UV-B radiation, which is relaxed from the sharp cutoff required in traditional flame detectors in order to distinguish between flames and other radiation sources such as sunlight. Flame detector 100 is able to suppress false alarms when UV sensor 102 receives solar UV, including UV-B radiation, by use of secondary sensor 104. For example, a strong UV source can be a source emitting spectral radiance in UV-B and/or UV-C wavelengths at a magnitude on the order of $1\times10^{-5}$ W/(cm$^2$ nm), and a weak UV source can be a source emitting spectral radiance in UV-B and/or UV-C wavelengths at a magnitude below $1\times10^{-14}$ W/(cm$^2$ nm). It is contemplated that secondary sensor 104 can be a NIR sensor sensitive to NIR radiation, e.g., at or near 700 nm wavelength. Controller 106 can be operatively connected to the NIR sensor to signal an alarm in response to receiving input from UV sensor 102 indicative of a strong UV source and input from secondary sensor 104 indicative of a weak NIR radiation source, as indicated in the row labeled "Flame" in FIG. 2. Controller 106 suppresses an alarm in response to receiving a signal from UV sensor 102 indicative of a weak UV source and a signal from secondary sensor 104 indicative of a strong NIR radiation source, as indicated in the row labeled "Sunlight" in FIG. 2. Those skilled in the art will readily appreciate that the "Sunlight" label in FIG. 2 is also indicative of other non-flame sources of radiation. For example, a strong NIR source can be a source emitting 700 nm spectral radiance at a magnitude on the order of $1\times10^{-5}$ W/(cm$^2$ nm), and a weak NIR source can be a source emitting 700 nm spectral radiance at a magnitude on the order of $1\times10^{-14}$ W/(cm$^2$ nm) to $1\times10^{-11}$ W/(cm$^2$ nm).

Flame detector 100 can optionally include a visible radiation sensor 112 sensitive to visible radiation. Visible radiation sensor 112 is operatively connected to controller 106 to help distinguish sunlight from flame signal. Specifically, sunlight emits significantly more radiation in the visible spectrum compared to the NIR spectrum. In contrast, flame emits significantly more radiation in the NIR spectrum compared to the visible spectrum. The ratio of the signals from the visible and NIR sensors can further help to reject false alarms due to sunlight exposure or can affirm presence of flame. In any of the embodiments, UV sensor 102 and secondary sensor 104 can be thin film sensors stacked on top of one another, as indicated schematically in FIG. 1, with UV sensor 102 on top. For example, UV, visible, and NIR sensors 102, 104, and 112 can all be thin film sensors stacked on top of one another with UV sensor 102 on top in the order shown in FIG. 1, or the layer order of secondary sensor 104 and visible sensor 112 can be switched. With UV sensor 102 on top of the layer stack, wherein UV sensor 102 is transparent to NIR and/or visible radiation, the corresponding radiation can pass through UV sensor 102 to reach the corresponding sensors underlying UV sensor 102. These thin film type sensors vary in electrical resistance based on the amount of radiation received in their sensitivity range. Thus controller 106 receives a signal from reach sensor 102, 104, and/or 112 that varies based on the amount of radiation received in the given sensitivity range.

It is also contemplated that the secondary sensor 104 can be a visible radiation sensor sensitive to visible radiation instead of being a NIR sensor as described above. In such embodiments controller 106 treats the signals from a visible radiation source in the same manner described above for NIR radiation, and the radiation levels described above for strong and weak NIR radiation sources can be the same levels used for discriminating between strong and weak visible radiation sources since the spectral profiles for flames and non-flame sources such as sunlight are similar for NIR and visible wavelengths.

The third row in FIG. 2 is for radiation sources that give rise to strong signals from both UV sensor 102 and secondary sensor 104. In this situation, it is indeterminate from sensors 102 and 104 alone whether the radiation source is a flame or non-flame source. More information is therefore needed in order to determine whether to suppress the alarm as a false alarm. Controller 106 can be configured to either suppress or signal an alarm in this situation. For example, flame detector 100 can optionally include a smoke sensor 114 operatively connected to the controller 106. Controller 106 can then signal an alarm in response to receiving input from UV sensor 102 indicative of a strong UV source, input from secondary sensor 104 indicative of a strong non-UV radiation source, and input from smoke sensor 114 indicative of the presence of smoke. Controller 106 can suppress an alarm in response to receiving a signal from UV sensor 102 indicative of a strong UV source, a signal from secondary sensor 104 indicative of a strong non-UV radiation source, and input from smoke sensor 114 indicative of lack of smoke. Input indicative of a lack of smoke can include absence of a signal, for example, or an actual signal indicative of no smoke detected. Thus, the input from smoke sensor 114 resolves the indeterminacy arising from strong UV and non-UV radiation. Smoke sensor 114 can include any suitable sensors, such as carbon monoxide and/or particle sensors.

Another approach that can be used in addition to or in lieu of smoke sensor 114 to resolve the indeterminacy arising from a radiation source giving rise to strong signals from both UV sensor 102 and secondary sensor 104, is to default to either suppress the alarm, or to signal the alarm in the event of a radiation source as in the "Sunlight and Flame" row of FIG. 2. For example, controller 106 can be configured to treat the "Sunlight and Flame" row in FIG. 2 the same as it treats the "Sunlight" row, for lower risk applications where false alarms are unacceptable. It is also contemplated that instead, controller 106 can be configured to treat the "Sunlight and Flame" row in FIG. 2 the same as it treats the "Flame" row in high risk applications where false alarms are acceptable. Another option is for flame detector 100 to include an input module 116 operatively connected to controller 106 to accept user input indicative of whether or not an alarm should be signaled or suppressed in response to receiving the strong signals as in the "Sunlight and Flame" row of FIG. 2.

In the case where a UV sensor provides a weak response and the visible and/or NIR sensors provide weak response, a developing flame could be present. In such a case, flame detector 100 can optionally be put into a warning mode and secondary input from another sensor, for example, smoke sensor 114 can be used to confirm presence of fire. Another option is for flame detector 100 to include an input module 116 operatively connected to controller 106 to accept user input indicative of whether or not an alarm should be signaled or suppressed in response to receiving the strong signals as in the "Sunlight and Flame" row of FIG. 2.

Using a UV sensor, such as a thin film type UV sensor, that is sensitive to solar UV radiation as described herein, wherein a non-UV sensor such as a visible or NIR sensor is used to suppress false alarms, gives comparable alarm behavior to traditional systems using UV sensors with a sharp cutoff between UV-B and UV-C radiation. However, embodiments described herein can be manufactured for considerably less, can operate at considerably lower voltages, and can be made considerably more durable than the traditional sharp cutoff UV sensors. This can provide for more ubiquitous use of flame detectors, for example for home use to detect flames such as when a child lights a match or the like.

The methods and systems of the present disclosure, as described above and shown in the drawings, provide for flame detectors with superior properties including the potential benefits of reduced manufacturing cost, improved durability, and lower voltage operation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flame detector comprising:
    a UV sensor sensitive to solar UV radiation in the UV-C and UV-B wavebands;
    a secondary sensor sensitive to non-UV NIR radiation at or near 700 nanometers; and
    a controller operatively connected to the UV sensor and the secondary sensor to:
        signal an alarm in response to receiving input from the UV sensor indicative of a strong UV source and input from the secondary sensor indicative of a weak non-UV radiation source; and
        suppress an alarm in response to receiving a signal from the UV sensor indicative of a weak UV source and a signal from the secondary sensor indicative of a strong non-UV radiation source to distinguish between flames and solar UV including UV-B radiation.

2. The flame detector as recited in claim 1, wherein the secondary sensor is a NIR sensor sensitive to NIR radiation, and wherein the controller is operatively connected to the NIR sensor to:
    signal an alarm in response to receiving input from the UV sensor indicative of a strong UV source and input from the secondary sensor indicative of a weak NIR radiation source; and
    suppress an alarm in response to receiving a signal from the UV sensor indicative of a weak UV source and a signal from the secondary sensor indicative of a strong NIR radiation source.

3. The flame detector as recited in claim 2, further comprising a visible radiation sensor sensitive to visible radiation, wherein the visible radiation sensor is operatively connected to the controller for using the ratio of signals from the visible radiation sensor and the NIR sensor to reject false alarms due to sunlight exposure or affirm presence of flame.

4. The flame detector as recited in claim 3, wherein the UV, visible, and NIR sensors are thin film sensors stacked on top of one another with the UV sensor on top.

5. The flame detector as recited in claim 1, wherein the secondary sensor is a visible radiation sensor sensitive to visible radiation, and wherein the controller is configured to:
    signal an alarm in response to receiving input from the UV sensor indicative of a strong UV source and input from the secondary sensor indicative of a weak visible radiation source; and
    suppress an alarm in response to receiving a signal from the UV sensor indicative of a weak UV source and a signal from the secondary sensor indicative of a strong visible radiation source.

6. The flame detector as recited in claim 1, wherein the UV sensor and the secondary sensor are thin film sensors stacked on top of one another with the UV sensor on top.

7. The flame detector as recited in claim 1, further comprising a smoke sensor operatively connected to the controller to:
    signal an alarm in response to receiving input from the UV sensor indicative of a strong UV source, input from the secondary sensor indicative of a strong non-UV radiation source, and input from the smoke sensor indicative of the presence of smoke; and
    suppress an alarm in response to receiving input from the UV sensor indicative of a strong UV source, input from the secondary sensor indicative of a strong non-UV radiation source, and input from the smoke sensor indicative of lack of smoke.

8. The flame detector as recited in claim 1, wherein the controller is configured to suppress an alarm in response to receiving a signal from the UV sensor indicative of a strong UV source, a signal from the secondary sensor indicative of a strong non-UV radiation source.

9. The flame detector as recited in claim 1, wherein the controller is configured to signal an alarm in response to receiving a signal from the UV sensor indicative of a strong UV source, a signal from the secondary sensor indicative of a strong non-UV radiation source.

10. The flame detector recited in claim 1, further comprising an input module operatively connected to the controller to accept user input indicative of whether or not an alarm should be signaled or suppressed in response to receiving a signal from the UV sensor indicative of a strong UV source, a signal from the secondary sensor indicative of a strong non-UV radiation source.

11. A method of flame detection comprising:
signaling an alarm in response to receiving input from a UV sensor indicative of a strong UV source and input from the secondary sensor indicative of a weak non-UV radiation source emitting non-UV NIR radiation at or near 700 nanometers, wherein the UV sensor is sensitive to solar UV radiation in the UV-C and the UV-B waveband; and
suppressing an alarm in response to receiving a signal from the UV sensor indicative of a weak UV source and a signal from the secondary sensor indicative of a strong non-UV radiation source, thereby distinguishing between flames and solar UV including UV-B radiation.

12. The method recited in claim 11, further comprising:
signaling an alarm in response to receiving input from the UV sensor indicative of a strong UV source, input from the secondary sensor indicative of a strong non-UV radiation source, and input from a smoke sensor indicative of the presence of smoke; and
suppressing an alarm in response to receiving a signal from the UV sensor indicative of a strong UV source, a signal from the secondary sensor indicative of a strong non-UV radiation source, and input from the smoke sensor indicative of lack of smoke.

13. The method recited in claim 11, further comprising:
complying with user input indicative of whether or not an alarm should be signaled or suppressed in response to receiving a signal from the UV sensor indicative of a strong UV source and a signal from the secondary sensor indicative of a strong non-UV radiation source.

14. The method recited claim 11, wherein signaling and suppressing include receiving input from the UV sensor indicative of both a UV-C and UV-B radiation.

* * * * *